Feb. 13, 1934.  E. NIELSEN  1,946,540
POWER UNIT
Filed Feb. 27, 1933   3 Sheets-Sheet 1
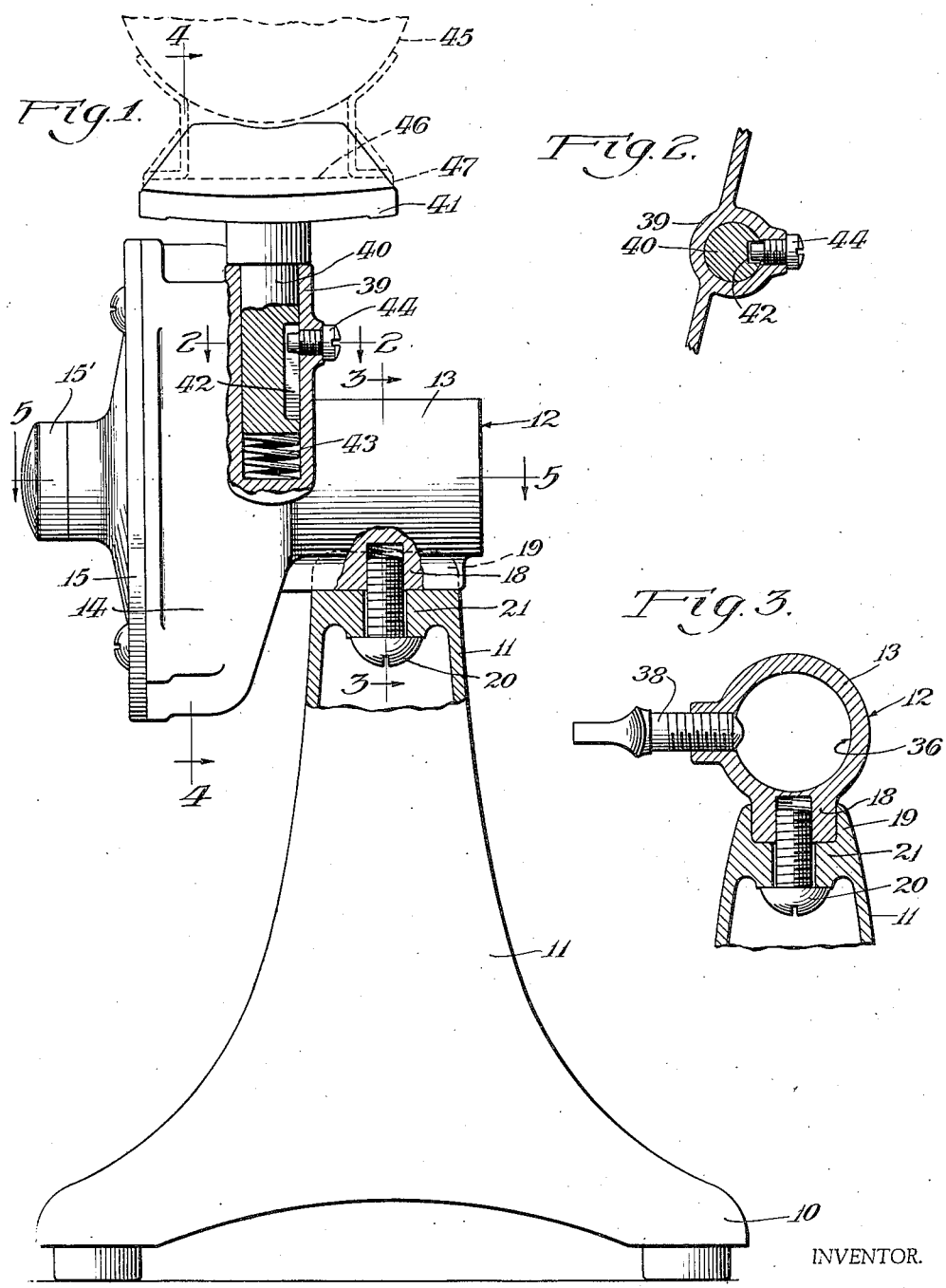
INVENTOR.
Emanuel Nielsen
BY Bertha L. MacGregor
ATTORNEY.

Feb. 13, 1934.　　　　E. NIELSEN　　　　1,946,540
POWER UNIT
Filed Feb. 27, 1933　　　3 Sheets-Sheet 2
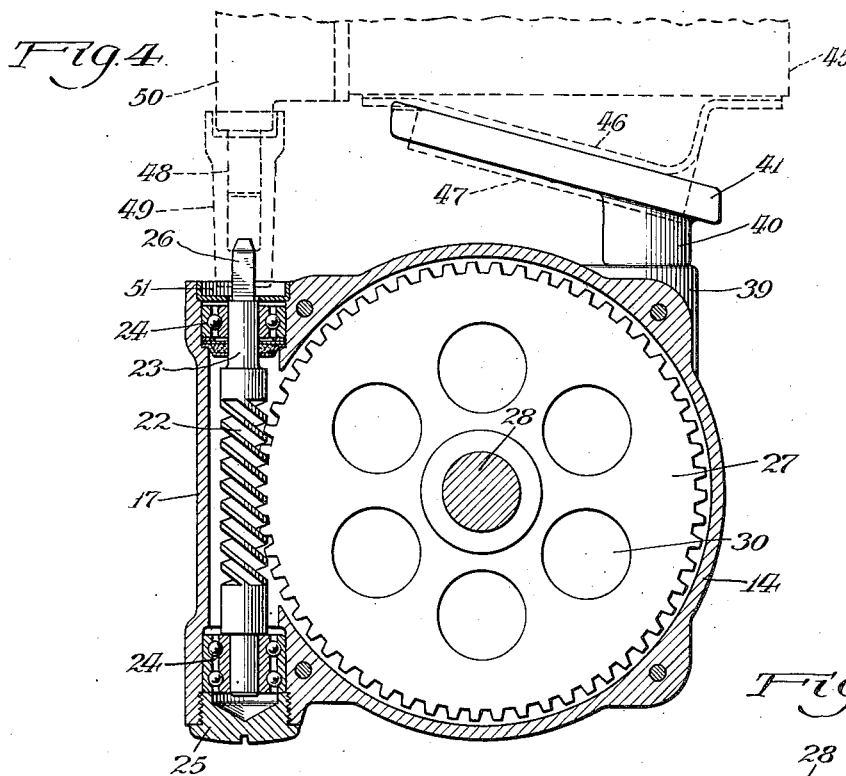
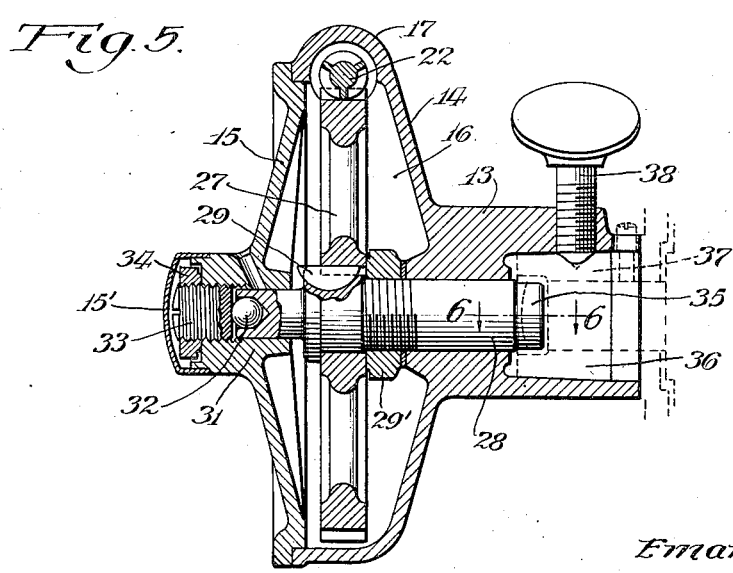
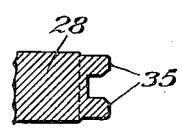
INVENTOR.
Emanuel Nielsen
BY Bertha L. MacGregor
ATTORNEY.

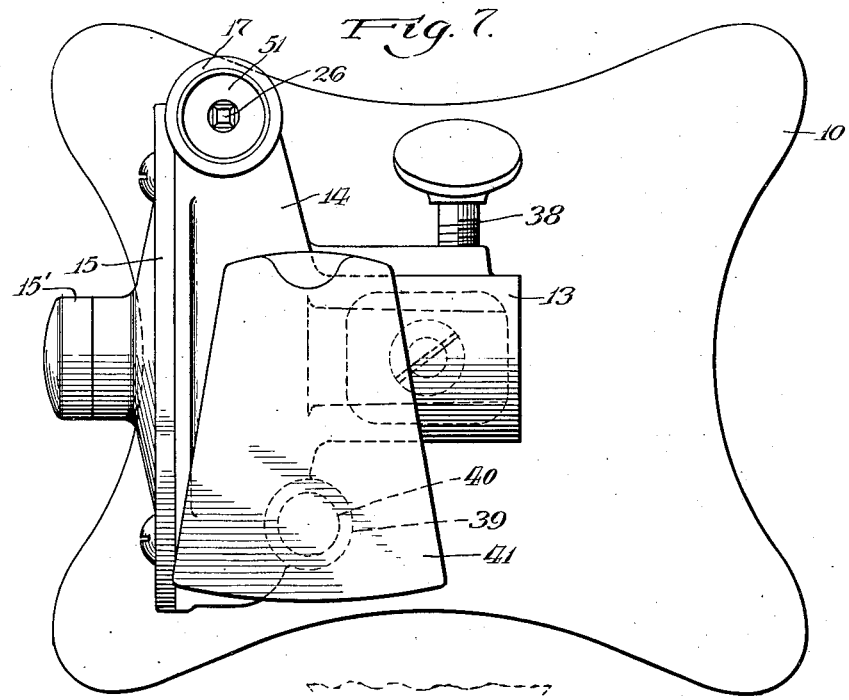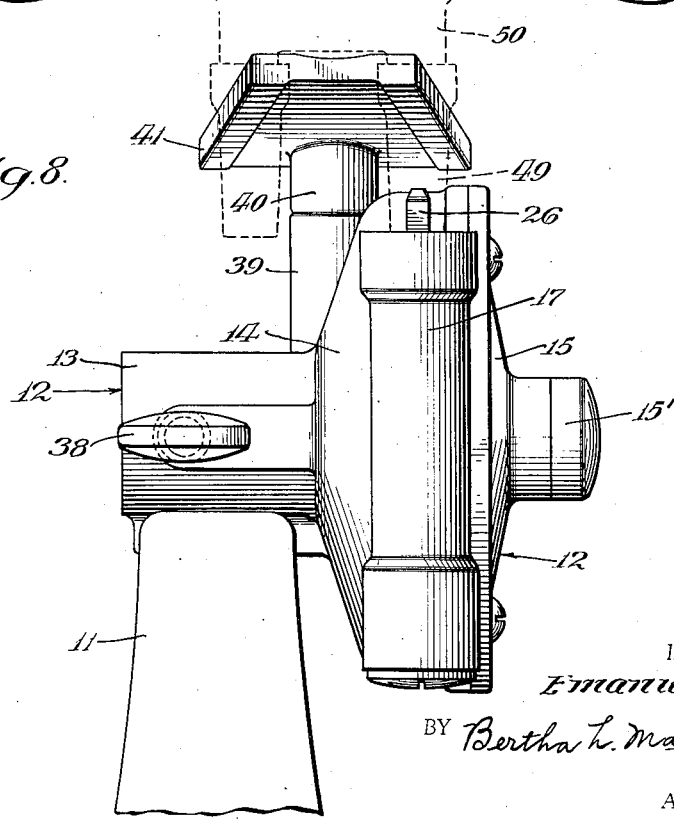

Patented Feb. 13, 1934

1,946,540

UNITED STATES PATENT OFFICE 1,946,540

POWER UNIT

Emanuel Nielsen, Racine, Wis., assignor to Hamilton Beach Manufacturing Company, Racine, Wis., a corporation of Wisconsin Application February 27, 1933. Serial No. 658,786

5 Claims. (Cl. 74—7)

This invention relates to a power transmitting unit which is portable, stable, compact and self-contained. The unit is adapted for transmitting power from a portable motor to the drive shafts of household devices such as meat grinders, slicer and shredder machines, and the like, which may be interchangeably attached to the power unit.

In the prior art are motor driven food mixers comprising a base, an upright support, a motor and gear casing on the support and rotatable agitators or beaters depending from the motor and gear casing. In order to utilize the motors of food mixers for operating other household devices, such as meat grinders and the like, it has been customary to provide power transmitting attachments adapted for temporary attachment to the food mixer motor when supported on its raised support, and to these power transmitting attachments the meat grinder or other device was attached. Suitable power transmitting means have also been embodied directly in the food mixer for operating household devices other than the food mixing agitators or beaters. These expedients are not satisfactory, for in the case of the former, the user is required first to carry the power transmitting attachment to the food mixer, then to make the attachment to some part of the food mixer motor or gearing, and finally to attach the grinder or other device to be operated, which involves inconvenience and results in an unattractive, non-compact, unbalanced and unstable construction. To embody the power transmitting mechanism for driving meat grinders and the like directly in the food mixer is likewise objectionable because the weight of the mixer is undesirably and permanently increased, and the symmetrical appearance and stability of the food mixer are impaired by the attachment of the household device to be operated by the food mixer motor. Furthermore, the food mixer support, designed primarily to carry only the food mixer, is not suitable for efficiently carrying the additional attachments.

One of the objects of the invention, therefore, is to produce a sturdy, stable, self-contained power transmitting unit, adapted to support the portable motor of a food mixer, or other motor, and provided with means for operatively connecting the motor to the power unit, and for connecting the power unit to interchangeable household devices.

Another object of the invention is to transmit power from the motor to the device to be operated with the least possible loss of power, and to this end I have provided the shafts of the unit with friction reducing devices herein described.

Another object is to provide the power unit with means for supporting the motor in operative relation to the power transmitting mechanism, whereon the motor may be positioned by a sliding movement on the support and retained in operative position without the aid of fastening means. The means for supporting the motor and for establishing driving connection between the motor shaft and the power unit shaft provide a non-rigid connection whereby power is transmitted without strain on the coupling.

Other objects and advantages will appear from the following description:

In the drawings:

Fig. 1 is an end elevation, partly in section, of a power transmitting unit embodying my invention, part of one end of a motor being shown in dotted lines.

Fig. 2 is a horizontal sectional view of a detail, taken on the line 2—2 of Fig. 1.

Fig. 3 is a vertical sectional view taken on the line 3—3 of Fig. 1.

Fig. 4 is a vertical sectional view taken on the line 4—4 of Fig. 1, and showing part of the side elevation of a motor in dotted lines.

Fig. 5 is a horizontal sectional view taken on the line 5—5 of Fig. 1.

Fig. 6 is a sectional view of a detail, taken on the line 6—6 of Fig. 5.

Fig. 7 is a plan view of the power transmitting unit.

Fig. 8 is an elevation of that end of the device opposite the end shown in Fig. 1, and showing in dotted lines part of the forward end of the motor.

In that embodiment shown in the drawings, the base 10 is integral with the upright, centrally located standard 11, on which is fixedly mounted the housing indicated as a whole at 12.

The housing 12 comprises a horizontally disposed shaft housing 13 integral with a gear housing 14 closed by a cover plate 15, forming a relatively narrow, substantially circular chamber 16 disposed at right angles to the axis of the shaft housing 13. At one end of the housing members 14 and 15, preferably integral with the part 14, is a vertically disposed cylindrical housing 17, the interior of which communicates with the chamber 16.

The horizontal portion 13 of the housing 12 is mounted on the standard 11 as best shown in Figs. 1 and 3, the depending lug 18 on the part 13 being fitted between the walls 19 of the recessed upper end of the standard. The screw 20 extends through the web 21 into the lug 18, to firmly unite the standard and housing.

Referring now to the power transmitting mechanism in the housing 12, a triple threaded worm 22 on a shaft 23 is mounted in the cylindrical portion 17 of the housing. The shaft 23 is rotatably mounted in ball bearings 24, 24. The lower end of the housing 17 is closed by the screw cap 25. The upper end 26 of the shaft 23 is square in cross section and protrudes from the housing 17. The worm 22 meshes with a worm wheel 27 keyed to the horizontal shaft 28 by a key 29, and held by a shaft bearing nut 29'. The apertures 30 reduce the weight of the worm wheel 27. The shaft 28 is rotatably mounted in the cylindrical housing 13 and bearing 31 formed in the plate 15 of the housing.

At the end supported in the bearing 31, the shaft 28 is notched to receive a thrust ball 32 which bears against the adjusting screw 33 in the end of the bearing 31. The adjusting screw 33 is locked in adjusted position by a lock nut 34. A cap 15' covers the thrust bearing members. At its opposite end, the shaft 28 is bifurcated to form ears 35 which extend into the recess 36 for engaging the drive shaft of a household device to be driven by the shaft 28. The recess 36 is adapted to receive the drive shaft bearing of a meat grinder or other device, as indicated in dotted lines 37, and the hand screw 38 which extends through the housing 13 engages a notch in the drive shaft bearing 37 and thus securely retains the household device in operative position relatively to the shaft 28 of the power unit.

The means for mounting a portable motor on the power unit will now be described. The gear housing 14, at that end opposite the housing 17, is provided with a cylindrical socket 39 for the reception of the stem 40 of a motor supporting saddle 41. The stem 40 is slotted at 42 and rests on a coil spring 43. A screw 44 extends through the socket 39 into the slot 42 of the stem 40. The saddle 41 is fixed on the stem in an inclined position, as best shown in Fig. 4, with that end nearest the worm shaft 23 raised above the opposite end. The saddle 41 is wedge shaped, its raised end being of smaller transverse width than its lower end. The motor 45, shown in dotted lines, is preferably provided on its lower side with a flanged plate 46 inclined complementally to the saddle 41. The flanges 47 of the plate engage the divergent side margins of the saddle 41 when the plate 46 of the motor 45 is slipped into position on the saddle 41 by a downwardly and rearwardly sliding movement. The engagement of the plate flanges 47 with the sides of the saddle 41 limit the downward movement of the plate 46 and motor 45. One of the agitator drive shafts 48 of the motor may be coupled to the end 26 of the worm shaft 23, in driving relationship, by the coupling 49. The saddle 41 and plate 46 support the motor in what may be termed a floating position so that extreme fineness of manufacture is unnecessary, and the coupling of the parts 23 and 49 may be accomplished without strain on the shaft end 26. The plate 46 is designed for movement on the saddle 41 to a stopping point which will bring the coupling 49 very slightly rearwardly of the shaft 23, and the motor may then be manually shifted to the slight degree required for aligning the coupling 49 with the end 26 of the shaft 23. The tendency of the motor to move downwardly on the saddle 41 is slight and not sufficient to exert any appreciable side pressure on the shaft 23.

This arrangement provides for establishing the driving relationship between coupling 49 and shaft 23 notwithstanding irregularities in manufacture of the parts.

The motor 45 with gear casing and bearing plate 46 shown herein are parts of a food mixer which comprises, in addition to the parts mentioned, a base and overhanging arm for supporting the motor, and agitators removably connected to the drive shafts 48. While the power unit of this invention is particularly adapted for use with the food mixer motor herein shown, the invention is not limited to the combination shown.

While the motor is not resting on the saddle 41, the expansive power of the spring 43 in the sacket 39 raises the saddle 41 to the extent permitted by the slot 42 in the stem 40. The operator manually supports the motor while it is being slipped into position on the saddle 41, and when the coupling 49 is directly above the shaft end 26, the operator releases her hold on the motor handle and the weight of the motor on the saddle 41 compresses the spring 43 and as the saddle is lowered into the position shown in the drawings, the coupling 49 will engage the worm shaft end 26 of the power unit. An apertured cupped member 51 surrounding the shaft end 26 receives the lower end of the coupling 49. The saddle, motor and coupling are thus lowered by a vertical drop into operative position on the power unit and a driving connection is established without strain on the coupling or shafts. The motor floats on the saddle and the yielding mounting of the saddle accommodates the coupling 49 to the shaft end 26. Power is transmitted from the motor through shafts 48, 23, gear 27, and shaft 28 to the household device to be driven, with a minimum of friction and maximum power delivery, due to the type of bearings provided for the shafts 23 and 28, and the arrangement and construction described. Thus a fractional horse power motor of the size used in food mixers may be employed with my power unit for driving devices which ordinarily require more power than that afforded by the motors referred to.

The user of my invention takes the motor to the work. It obviates the necessity of carrying to the motor the working tools, the utensils and the materials to be treated. The power unit is self-contained and the fact that a food mixer motor may be brought to the unit instead of having to carry the power transmitting mechanism to a food mixer and to make the attachments on the mixer motor while the latter is part of the food mixer structure, is a great advantage and affords an efficient means for utilizing a food mixer motor to best advantage for operating a variety of household devices.

Changes may be made in details of construction without departing from the scope of my invention and I do not intend to be limited to the exact form shown and described, except as set forth in the appended claims.

I claim:

1. A power transmission unit comprising a housing, power transmitting mechanism in the housing including a gear shaft having an end formed for operative connection with the power shaft of a portable motor device, a motor support movably mounted relative to the housing, and means for normally holding the support in extended position, said means being depressible by the weight of the motor device to effect automatic aligned driving connection between the motor device and gear shaft.

2. A power transmission unit comprising a housing, power transmitting mechanism in the housing including a vertical shaft having its upper end formed for operative connection with the power shaft of a portable motor, a motor saddle, and spring pressed means connecting the saddle to the housing and permitting movement of the saddle relative to the vertical shaft of the housing to effect automatic aligned driving connection between the motor and vertical shaft.

3. A power transmission unit comprising a housing, a power transmitting mechanism in the housing including a gear shaft having an end formed for operative connection with the power shaft of a portable motor, a motor support, said housing having means extending in a plane parallel to the axis of the gear shaft for receiving the motor support, and means cooperating with said last mentioned means and motor support for normally maintaining the support extended relative to said gear shaft, said means being yieldable to effect automatic aligned driving connection between the motor and gear shaft.

4. A power transmission unit comprising a housing, power transmitting mechanism in the housing including a vertical shaft having its upper end formed for operative connection with the power shaft of a portable motor, a socket formed in the upper part of the housing with its major dimension extending in a plane parallel to the axis of the vertical shaft, a spring in the socket, and a saddle having a stem slidably mounted in the socket on said spring, the saddle and its stem cooperating with the socket and spring to yieldably support a portable motor and effect automatic aligned driving connection between the motor and vertical shaft.

5. In a power transmission unit comprising a housing and power transmitting mechanism in the housing including a gear shaft having an end formed for operative connection with the power shaft of a portable motor, an inclined wedge-shaped motor supporting saddle yieldably mounted on the housing for movement in a plane parallel to the axis of said gear shaft, whereby to support a portable motor in position for automatic aligned driving connection with said gear shaft.

EMANUEL NIELSEN.